(12) United States Patent
Carroll

(10) Patent No.: US 9,249,736 B2
(45) Date of Patent: Feb. 2, 2016

(54) INLET GUIDE VANES AND GAS TURBINE ENGINE SYSTEMS INVOLVING SUCH VANES

(75) Inventor: Christian A. Carroll, Haddam, CT (US)

(73) Assignee: United Technologies Corporation, Hartford, CT (US)

(*) Notice: Subject to any disclaimer, the term of this patent is extended or adjusted under 35 U.S.C. 154(b) by 2060 days.

(21) Appl. No.: 12/344,942

(22) Filed: Dec. 29, 2008

(65) Prior Publication Data

US 2010/0166543 A1  Jul. 1, 2010

(51) Int. Cl.
| | |
|---|---|
| F01D 17/12 | (2006.01) |
| F02C 9/22 | (2006.01) |
| F01D 5/14 | (2006.01) |
| F01D 17/16 | (2006.01) |

(52) U.S. Cl.
CPC . *F02C 9/22* (2013.01); *F01D 5/146* (2013.01); *F01D 17/162* (2013.01); *F05B 2240/31* (2013.01)

(58) Field of Classification Search
CPC ......... F01D 5/146; F01D 17/162; F02C 9/22; F05B 2240/31
USPC .................................................. 415/151, 160
See application file for complete search history.

(56) References Cited

U.S. PATENT DOCUMENTS

| | | | |
|---|---|---|---|
| 3,990,810 A * | 11/1976 | Amos et al. ................... 415/161 |
| 4,013,377 A * | 3/1977 | Amos ........................... 415/161 |
| 4,856,962 A | 8/1989 | McDow |
| 4,995,786 A | 2/1991 | Wheeler et al. |
| 5,314,301 A | 5/1994 | Knight |
| 5,366,176 A * | 11/1994 | Loewy et al. ................. 244/99.8 |
| 5,392,614 A * | 2/1995 | Coffinberry ..................... 62/402 |
| 5,485,958 A * | 1/1996 | Nightingale ............. 239/265.19 |
| 5,620,301 A | 4/1997 | Lawer |
| 5,794,432 A * | 8/1998 | Dunbar et al. ................... 60/204 |
| 6,045,325 A | 4/2000 | Horvath et al. |
| 6,318,668 B1 * | 11/2001 | Ulanoski et al. ............. 244/12.5 |
| 6,619,916 B1 * | 9/2003 | Capozzi et al. ............... 415/160 |
| 7,114,911 B2 | 10/2006 | Martin et al. |
| 7,195,456 B2 | 3/2007 | Aggarwala et al. |
| 7,231,770 B2 * | 6/2007 | Epstein ........................... 60/792 |
| 2001/0010798 A1 * | 8/2001 | Dailey et al. .................. 415/159 |
| 2004/0091350 A1 * | 5/2004 | Graziosi et al. ................... 415/1 |
| 2006/0045728 A1 | 3/2006 | Martin et al. |
| 2007/0092372 A1 * | 4/2007 | Carroll et al. ................. 415/191 |

FOREIGN PATENT DOCUMENTS

WO     2005119028     12/2005

* cited by examiner

Primary Examiner — Steven Loke
Assistant Examiner — Victoria K Hall
(74) Attorney, Agent, or Firm — Carlson, Gaskey & Olds, P.C.

(57) ABSTRACT

Inlet guide vanes and gas turbine engine systems involving such vanes are provided, In this regard, a representative an inlet guide vane for a gas turbine engine includes: a fixed strut; and a variable flap located downstream of the fixed strut and being movable with respect thereto; the fixed strut having a leading edge, a trailing edge and side surfaces extending between the leading edge and the trailing edge, the side surfaces being asymmetric with respect to each other.

15 Claims, 2 Drawing Sheets

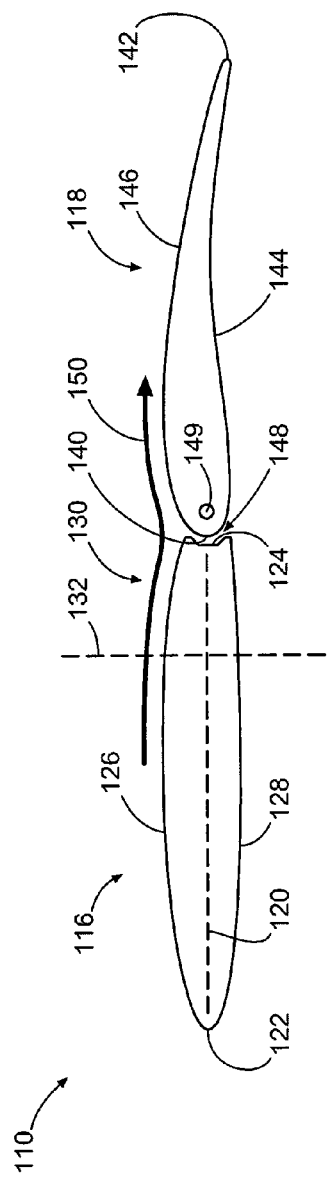
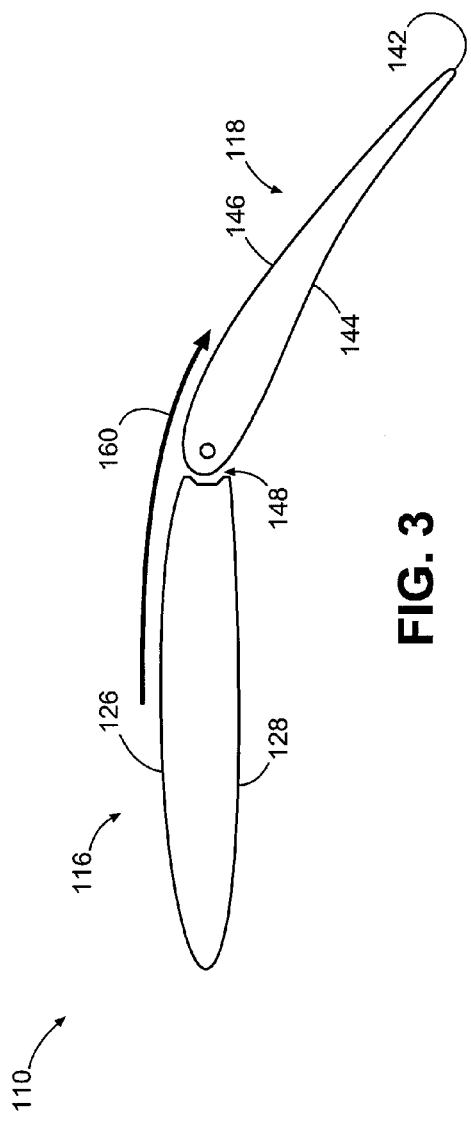
FIG. 2
FIG. 3

INLET GUIDE VANES AND GAS TURBINE ENGINE SYSTEMS INVOLVING SUCH VANES

BACKGROUND

1. Technical Field

The disclosure generally relates to gas turbine engines.

2. Description of the Related Art

Some gas turbine engines include variable geometry inlet guide vanes that are positioned upstream of the compressors (also known as "fans" in some implementations) of the engines. Such an inlet guide typically includes a fixed strut and a movable flap positioned adjacent to and downstream of the fixed strut. The flap can be selectively positioned to alter deflection of airflow to downstream components of the engine. Unfortunately, some positions of the flap may result in unwanted airflow separation from the surface of the flap, resulting in a turbulent airflow. Such airflow tends to increases wear on the components downstream of the inlet guide vane.

SUMMARY

Inlet guide vanes and gas turbine engine systems involving such vanes are provided. In this regard, an exemplary embodiment of an inlet guide vane for a gas turbine engine comprises: a fixed strut; and a variable flap located downstream of the fixed strut and being movable with respect thereto; the fixed strut having a leading edge, a trailing edge and side surfaces extending between the leading edge and the trailing edge, the side surfaces being asymmetric with respect to each other.

An exemplary embodiment of an inlet guide vane assembly for a gas turbine engine comprises: multiple inlet guide vanes; a first of the inlet guide vanes having a fixed strut and a variable flap; the variable flap being located downstream of the fixed strut and being movable with respect thereto; the fixed strut exhibiting chordwise asymmetry operative to reduce a tendency of gas flowing along surfaces of the inlet guide vane to separate therefrom.

An exemplary embodiment of a gas turbine engine comprises: a compressor section having an inlet guide vane assembly, a set of rotatable blades and a set of stationary vanes; the inlet guide vane assembly being located upstream of the set of rotatable blades and the set of stationary vanes, the inlet guide vane assembly having multiple guide vanes; a first of the guide vanes having a fixed strut and a variable flap, the variable flap being located downstream of the fixed strut and being movable with respect thereto, the fixed strut having a leading edge, a trailing edge and side surfaces extending between the leading edge and the trailing edge, the side surfaces being asymmetric with respect to each other.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 2 is a schematic diagram depicting an inlet guide vane of the embodiment of FIG. 1, as viewed along section line 2-2 with the flap in a nominal position.

FIG. 3 is a schematic diagram depicting an inlet guide vane of the embodiment of FIG. 1, as viewed along section line 2-2 with the flap in a deflected position.

DETAILED DESCRIPTION

Figure 1:
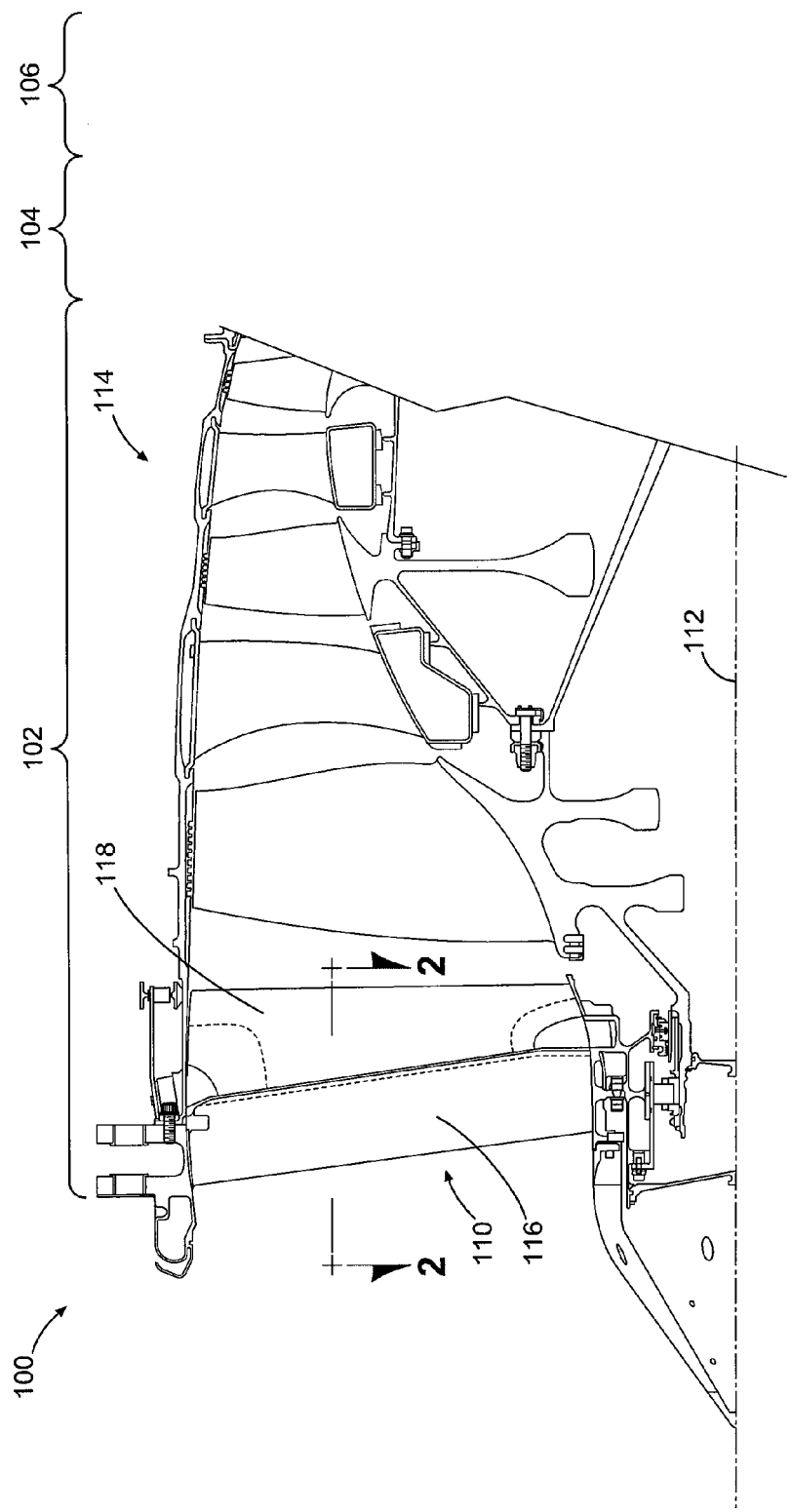
FIG. 1 is a schematic diagram depicting a portion of an exemplary embodiment of a gas turbine engine.

Inlet guide vanes and gas turbine engine systems involving such vanes are provided, several exemplary embodiments of which will be described in detail. In this regard, some embodiments involve the use of a fixed strut that exhibits chordwise asymmetry (i.e., the fixed strut is asymmetric with respect to the chord line, which extends from the leading edge to the trailing edge of the strut). Such asymmetry may reduce a tendency of gas flowing along surfaces of the inlet guide vane to separate, thus maintaining laminar flow along the surfaces. In some embodiments, the chordwise asymmetry is expressed by an aft portion of the fixed strut (which is located adjacent to the suction side surface of a downstream flap) that enables turning of gas prior to the gas reaching the flap (e.g., turning with respect to the axial flow direction). As such, some of the turning of the gas is accomplished by the strut, thereby potentially resulting in more overall turning of the gas. Regardless of the degree of turning, less of the turning is provided by the flap since some of the turning is provided by the strut itself. This is in contrast to conventional vanes, which perform the turning of gases entirely with the flaps.

In this regard, reference is made to the schematic diagram of FIG. 1, which depicts a portion of an exemplary embodiment of a gas turbine engine. As shown in FIG. 1, engine 100 is depicted as a turbojet engine that incorporates a compressor section 102. Notably, although various other components are not depicted, a combustion section 104 and a turbine section 106 are located downstream of the compressor section. It should also be noted that, although depicted as a turbojet gas turbine engine, it is to be understood that the concepts described herein are not limited to use with turbojets as the teachings may be applied to other types of gas turbine engines.

Inlet guide vanes (e.g., vane 110) are positioned radially about the centerline 112 of the engine upstream of a compressor 114, which in this embodiment is a low-pressure compressor. Each of the inlet guide vanes includes a fixed strut (e.g., fixed strut 116) and a variable flap (e.g., variable flap 118). The flap is pivotable about an axis to provide a range of positions for variably deflecting airflow into the downstream components of the engine, e.g., the compressor 114.

As shown in FIG. 2, which is a schematic, section view taken along line 2-2 of FIG. 1, strut 116 has a chordline 120 (depicted in dashed lines), which in this embodiment evenly divides a symmetrical front portion of strut. Strut 116 includes a leading edge 122, a trailing edge 124, and opposing side surfaces 126, 128 that extend between the leading edge and the trailing edge. Notably, an aft portion 130 of the strut, which in this embodiment is aft of the location of maximum thickness 132, exhibits chordwise asymmetry. Specifically, side surface 126 exhibits negative camber in a vicinity of flap 118. In some embodiments, the negative camber begins at between approximately 25% and approximately 95% chord of the fixed strut, preferably between approximately 50% and approximately 80% chord of the fixed strut.

Flap 118 includes a leading edge 140, a trailing edge 142, a pressure side surface 144 and a suction side surface 146. The leading edge of the flap is separate from the trailing edge of the strut by a gap 148. The flap is pivotable about an axis 149 to exhibit a range of positions between a nominal or zero deflection position (shown in FIG. 2), at which a minimum deflection is imparted to gas flowing over the variable flap, and a maximum deflection position (shown in FIG. 3), at which a maximum deflection is imparted to gas flowing over the variable flap.

In all deflection positions, the leading edge of the flap of this embodiment is masked behind the trailing edge of the strut. In some embodiments, this is accomplished even though the thickness of the fixed strut at the trailing edge is between approximately 90% and approximately 50% of a maximum thickness of the variable flap.

However, at the nominal position (FIG. 2), the suction side surface 146 of the flap is not masked by the strut as shown by the exemplary streamline 150, which deflects inwardly in the vicinity of gap 148. In contrast, at the maximum deflection position (FIG. 3), the suction side surface 146 of the flap is masked by the strut as evidenced by the exemplary streamline 160, which exhibits a smooth, continuous curve in the vicinity of gap 148. Notably, flap thickness can be based, at least in part, on passage requirements and can be thicker or thinner than the strut as needed.

In the nominal position shown in FIG. 2, airflow flows along the opposing side surfaces 126,128 of the strut. As the airflow along surface 126 approaches the gap 148, the airflow flows inwardly toward the gap due to the negative camber of the aft portion 130 of the strut. Thereafter, the airflow flows along the suction side 146 of the flap until departing in a vicinity of the trailing edge 142. The airflow along side surface 128 of the strut continues toward trailing edge 124, across the gap 148, and then along pressure side surface 144 of the flap. Notably, the flap does not contribute to or detract from performance of the strut in the nominal position.

In a deflected position, such as the maximum deflection position of FIG. 3, airflow flowing across side surface 126 of the strut is turned between approximately 0.5 degrees and approximately 10 degrees (preferably between approximately 1 degree and approximately 5 degrees) prior to the gas flow reaching the flap. Thereafter, the airflow flows along the suction side 146 of the flap until departing in a vicinity of the trailing edge. In some embodiments, up to approximately 60 degrees of airflow deflection, for example, can be provided without airflow separation from the vane.

By providing at least some of the turning of the airflow using the strut (i.e., prior to the airflow reaching the flap), the effective chord length of the flap is increased. In some embodiments, this can facilitate the use of a shorter flap, which correspondingly could require a smaller deflection force to achieve full deflection. In other embodiments, such as those in which axial restrictions limit the use of longer flaps, turning accomplished by the strut can provide for increased turning without flow separation.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. An inlet guide vane for a gas turbine engine comprising:
a fixed strut; and
a variable flap located downstream of the fixed strut and being movable with respect thereto;
the fixed strut having a leading edge, a trailing edge and side surfaces extending between the leading edge and the trailing edge, the side surfaces being assymetric with respect to each other, a trailing portion of the side surface of the fixed strut located adjacent to a suction surface of the variable flap is operative to turn gas flow between approximately 0.5 degrees and approximately 10 degrees prior to the gas flow reaching the variable flap.

2. The inlet guide vane of claim 1, wherein the trailing portion of the side surface of the fixed strut is operative to turn the gas flow between approximately 1 and degree approximately 5 degrees prior to the gas flow reaching the variable flap.

3. The inlet guide vane of claim 1, wherein upstream portions of the side surfaces of the fixed strut exhibit symmetry.

4. The inlet guide vane of claim 1, wherein the fixed strut exhibits a negative camber in a vicinity of the trailing edge.

5. The inlet guide vane of claim 4, wherein the negative camber begins at between approximately 25% and approximately 95% chord of the fixed strut.

6. The inlet guide vane of claim 5, wherein the negative camber begins at between approximately 50% and approximately 80% chord of the fixed strut.

7. The inlet guide vane of claim 1, wherein:
the variable flap has a suction side and a pressure side;
the variable flap is movable between a nominal position, at which a minimum deflection is imparted to gas flowing over the variable flap, and a maximum deflected position, at which a maximum deflection is imparted to gas flowing over the variable flap; and
in the nominal position, the suction side is not masked by the fixed strut.

8. The inlet guide vane of claim 7, wherein, in the maximum deflected position, the suction side is masked by the fixed strut.

9. The inlet guide vane of claim 7, wherein:
the variable flap is movable through a range of deflected positions between the nominal position and the maximum deflected position; and
throughout the range of deflected positions, the suction side is not masked by the fixed strut.

10. The inlet guide vane of claim 1, wherein a thickness of the fixed strut at the trailing edge is between approximately 90% and approximately 50% of a maximum thickness of the variable flap.

11. The inlet guide vane of claim 1, wherein:
the variable flap is movable through a range of deflected positions between a nominal position and a maximum deflected position; and
responsive to the variable flap being positioned in at least one of the deflected positions, the asymmetry of the side surfaces of the fixed strut is operative to turn gas flowing over one of the side surfaces of the fixed strut prior to the gas reaching the variable flap such that the turn provided by the asymmetry assists in turning of the gas accomplished by the position of the variable flap.

12. The inlet guide vane of claim 1, wherein:
the variable flap is movable through a range of deflected positions between a nominal position and a maximum deflected position; and
the asymmetry exhibited by the fixed strut reduces a tendency of gas flowing along the side surfaces of the fixed strut to separate from the inlet guide vane.

13. A gas turbine engine comprising:
a compressor section having an inlet guide vane assembly, a set of rotatable blades and a set of stationary vanes;
the inlet guide vane assembly being located upstream of the set of rotatable blades and the set of stationary vanes, the inlet guide vane assembly having multiple guide vanes;
a first of the guide vanes having a fixed strut and a variable flap, the variable flap being located downstream of the fixed strut and being movable with respect thereto, the fixed strut having a leading edge, a trailing edge and side surfaces extending between the leading edge and the trailing edge, the side surfaces being asymmetric with respect to each other, a trailing portion of the side surface of the fixed strut located adjacent to a suction surface of the variable flap is operative to turn gas flow between approximately 0.5 degrees and approximately 10 degrees prior to the gas flow reaching the variable flap.

14. The gas turbine engine of claim 13, wherein the inlet guide vane assembly is an inlet guide vane assembly for a low pressure compressor.

15. The gas turbine engine of claim 13, wherein the gas turbine engine is a turbojet.

* * * * *